(12) United States Patent
Le Hong et al.

(10) Patent No.: US 8,061,997 B2
(45) Date of Patent: Nov. 22, 2011

(54) DAMPING DEVICE FOR COMPOSITE BLADE

(75) Inventors: Son Le Hong, Thomery (FR);
Jean-Pierre Francois Lombard, Pamfou (FR)

(73) Assignee: SNECMA, Paris (FR)

( * ) Notice: Subject to any disclaimer, the term of this patent is extended or adjusted under 35 U.S.C. 154(b) by 662 days.

(21) Appl. No.: 12/209,537

(22) Filed: Sep. 12, 2008

(65) Prior Publication Data
US 2009/0074586 A1 Mar. 19, 2009

(30) Foreign Application Priority Data
Sep. 13, 2007 (FR) ..................................... 07 06430

(51) Int. Cl.
*F01D 5/18* (2006.01)
(52) U.S. Cl. ........ 416/230; 416/205; 416/207; 416/232; 416/241 R; 416/500
(58) Field of Classification Search .................. 415/117, 415/119, 177, 209.3; 416/95, 144, 205, 207, 416/220 R, 224, 229 R, 230, 232, 240, 241 R, 416/500
See application file for complete search history.

(56) References Cited

U.S. PATENT DOCUMENTS

| 3,357,850 | A | 12/1967 | Baker |
| 4,097,193 | A | 6/1978 | Bruensch et al. |
| 4,895,491 | A | 1/1990 | Cross et al. |
| 5,485,053 | A * | 1/1996 | Baz ................................. 310/326 |
| 5,913,661 | A * | 6/1999 | Panovsky et al. .......... 416/229 A |
| 7,086,831 | B2 * | 8/2006 | Harper ........................ 415/209.3 |
| 7,931,443 | B1 * | 4/2011 | Potter et al. .................... 416/224 |
| 2008/0075593 | A1 * | 3/2008 | Read et al. ...................... 416/95 |
| 2008/0075601 | A1 | 3/2008 | Giusti et al. |
| 2010/0232974 | A1 * | 9/2010 | De Moura et al. ............. 416/230 |

FOREIGN PATENT DOCUMENTS

| DE | 44 43 440 A1 | 7/1995 |
| EP | 0 496 550 A1 | 7/1992 |
| EP | 1 908 919 A1 | 4/2008 |
| GB | 2 391 270 A | 2/2004 |
| WO | WO 99/43955 | 9/1999 |

OTHER PUBLICATIONS

U.S. Appl. No. 12/144,960, filed Jun. 24, 2008, Baumhauer, et al.
U.S. Appl. No. 12/145,085, filed Jun. 24, 2008, Baumhauer, et al.
U.S. Appl. No. 12/144,994, filed Jun. 24, 2008, Baumhauer, et al.

* cited by examiner

*Primary Examiner* — Michael Lebentritt
(74) *Attorney, Agent, or Firm* — Oblon, Spivak, McClelland, Maier & Neustadt, L.L.P.

(57) ABSTRACT

The present invention relates to a blade made of composite, comprising a vane formed of woven filaments impregnated with a thermosetting resin with a protective element in the region of the leading edge of the vane comprising a part in the form of a rigid strip, said strip being secured to the vane. The blade is characterized in that at least one layer of a viscoelastic material is at least partially interposed between said rigid strip and the vane so as to form, with the protective element, a means of damping the vibrations of the vane.

16 Claims, 2 Drawing Sheets

DAMPING DEVICE FOR COMPOSITE BLADE

BACKGROUND OF THE INVENTION

The present invention relates to the field of turbomachines; it relates to the damping of a blade made of composite and is aimed more especially at damping turbojet engine fan blades.

Blades, particularly fan blades but also low-pressure compressor blades, made of carbon fiber composite, are produced in different ways. According to one method of manufacture, a stack of unidirectional plies or woven prepregs is formed and placed in a mold, orienting the successive plies differently, before compacting and polymerizing in an autoclave. According to another method, woven dry fiber prepregs are prepared and stitched together or alternatively, a single three-dimensional woven fiber or filament preform is created and then impregnated with resin by injection molding in a closed mold. The blade is made as a single piece comprising the root and the vane. It has various protective features to enhance its thermomechanical strength. Hence, a metallic protection is attached to the leading edge or to the entire contour of the vane comprising the leading edge, the blade tip and the trailing edge, this for example being in the form of a titanium component bonded to the entire surface of the leading edge and to a forward portion of the exterior surfaces of the extrados and of the intrados. Likewise, the exterior face of the intrados is reinforced by fitting a protective film that may be made of a synthetic material, for example polyurethane, bonded directly to the intermediate component.

The invention is aimed at this type of blade that has protection at least along the leading edge. One example of manufacture is described in patent EP 1.777.063 in the name of the present applicant.

Flutter is a phenomenon involving coupling between the aerodynamics and the elastic characteristics of the blade creating unstable situations. Flutter manifests itself asynchronously. A distinction is drawn between subsonic flutter and supersonic flutter. A fan blade is chiefly affected by subsonic flutter.

Flutter is a phenomenon that is difficult to predict because of the complexity of the coupling between the aerodynamic and mechanical responses. Further, mechanical blade damping is also generally not very well understood. Finally, in the present-day design of a blading that is being subjected to increasingly high loading, flutter is a phenomenon that needs to be taken into consideration quite especially.

DESCRIPTION OF THE PRIOR ART

In fan blade design, a flutter margin is estimated which is a measure, at a given flow rate, of the distance between the line of flutter and the operating line. This value is generally established from a known reference (the nearest one) to which are added the calculated differences between this reference configuration and the new configuration. The criteria nowadays used for subsonic flutter on 1F and 1T modes and on zero diameter coupled modes are:

The Twist Bend coupling (TBC) which represents the ratio between the displacements in the torsion mode and in the bending mode. The higher the TBC parameter, the greater the risk of flutter.

The reduced speed or Strouhal criterion which is given by the following formula:

$VR=W/C \times f \times pi$, where W is the relative speed, C is the chord of the blade at a given height and f is the frequency of the blade mode considered. This criterion represents the coherency between the vibrational frequency of the blading and the frequency of the unsteadiness of the flow along this blading.

There are other factors that may influence the flutter margin and these may sometimes be used when the phenomenon is encountered during testing: reducing the specific flow rate, reducing the number of blades or increasing the chord length, lubricating the blade roots, detuning.

It is an object of the invention to improve the harmonic response of the blade to asynchronous aerodynamic excitations of the flutter type such as described hereinabove by substantially improving the mechanical damping of the blade.

Another object of the invention is to improve the harmonic response of the blade to synchronous aerodynamic excitations such as:

Inlet duct distortions caused by flying conditions involving an angle of incidence—in climbs, descents, crosswinds.

Harmonic excitations generated by residual imbalance,

Fed back pressure fluctuations caused by a fixed impeller of the flow straightener type on a fan impeller.

Fed back pressure fluctuations or wake caused by a moving fan impeller on its neighbor in designs involving two contrarotating rotors.

The present applicant has, for a number of years, been investigating a damping technique performing initial evaluations on integrally bladed disks, or "blisks". These terms denote a disk and blade assembly manufactured as a single piece. The principle of operation of the damping system relies on the dissipation of energy through the shearing of a suitably sited viscoelastic material. Correct behavior of the damping system is dependent on the dimensions of the material and good adhesion between the material and the engine component.

U.S. Pat. No. 6,471,484 is also known and describes a system for damping vibrations in a gas turbine engine rotor comprising an integrally bladed disk. The vanes of the blades are provided with a cavity hollowed in an intrados or extrados and containing a layer of a damping material with a stress layer. A cover sheet covers the cavity. In operation, vibration damping is encouraged by the shear stresses induced in the damping material between the vane and the stress layer, on the one hand, and within the damping material situated between the stress layer and the cover sheet, on the other hand.

SUMMARY OF THE INVENTION

The present invention aims to improve on this technique in an application to a blade made of composite with a means of protecting its leading edge.

According to the invention, the blade made of composite, comprising a vane formed of filaments or fibers impregnated with a thermosetting resin with a protective element in the region of the leading edge of the vane comprising a part, in the form of a rigid strip, said strip being secured to the vane, is one wherein at least one layer of a viscoelastic material is at least partially interposed between said rigid strip and the vane so as to form, with the protective element, a means of damping the vibrations of the vane.

The viscoelastic material is preferably taken from the following materials: rubber, silicone, elastomer polymer, for the low temperatures experienced on the fan, or epoxy resin.

The invention therefore consists in using a viscoelastic material for a blade such as a fan blade made of woven composite of the RTM type. This layer is located between the titanium leading edge and the woven composite vane as a full or partial replacement for the layer of adhesive currently used.

A mechanical damping function is introduced into the turbomachine blade, such as an RTM composite fan blade. This function is also beneficial in the event of accidental loadings such as bird strike (or the loss of a blade) as it helps to dissipate the impact energy. In the latter instance, it therefore performs a dual function of damping vibrational response and bird strike.

By using the leading edge coated with a protective device, particularly one made of titanium, as backing layer for the damping system, no additional components are introduced.

Thus, the solution of the invention combines a number of advantages:

Good integration of the composite blade.

By using the metal leading edges as the backing layer, the additional cost of this damping function is limited.

The functions of damping foreign-object damage and flutter are combined.

There is leverage on the engineering, positioning and size of the damping zones.

The space left between the composite and the leading edge is suited to the necessary thickness of viscoelastic material. Thus, the layer of viscoelastic material is, for example, at least partially contained in a cavity formed in the composite or alternatively is at least partially contained in a cavity formed in the protective element.

The functions of this layer of viscoelastic material are:

To introduce mechanical damping for vibrational responses of the blade, particularly in the case of a fan blade in respect of bending mode 1F and torsion mode 1T.

To play a part in damping during phenomena such as bird strike, by absorbing some of the impact energy and thus limiting blade damage.

Thus, depending on the envisioned damping, the layer of viscoelastic material extends under the strip over part of its surface, more specifically the layer of viscoelastic material extends over a zone corresponding to a zone of maximum deformation for a determined vibration mode of the blade. If appropriate, the layer of viscoelastic material extends over a zone running parallel to the leading edge of the vane and can cover the entire leading edge.

The damping material may be single layer or multilayer depending on the environment, on the materials used, and on the damping characteristics sought.

According to one particular embodiment, the protective element that protects the leading edge is V-shaped comprising a solid central part and two strips positioned one on each side. The solid part of the protective element covers the leading edge, and the strips partially cover the two, intrados and extrados, faces of the leading edge.

The protective element that protects the leading edge is advantageously made of a metal foil, particularly a titanium foil.

According to one embodiment, an additional rigid plate is inserted between said strip and the vane with two layers of viscoelastic material, one on each side of the plate. The layers of viscoelastic material on each side of the plate may differ.

The layer of viscoelastic material will have, for example, been secured to the strip and/or to the vane by hot-cementing a film of viscoelastic material, for example, a vulcanized elastomer, or alternatively the layer of viscoelastic material will have been secured to the strip and/or the vane by bonding using an adhesive substance, and the latter preferably has a greater stiffness than the viscoelastic material.

The invention applies to gas turbine engine compressors and preferably to turbojet engine fans, possibly of the unducted fan type, in which the engine operating temperature is compatible with the operating temperature of the viscoelastic material.

BRIEF DESCRIPTION OF THE DRAWINGS

One nonlimiting embodiment of the invention is now described in greater detail with reference to the attached drawings in which.

DESCRIPTION OF THE PREFERRED EMBODIMENT

Figure 1:
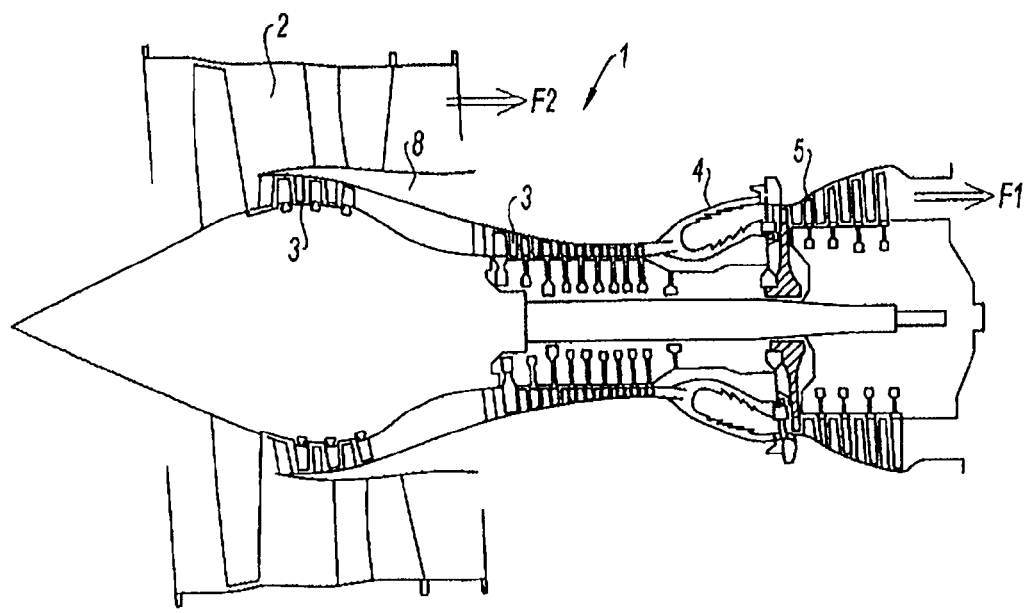
FIG. 1 schematically depicts a turbojet engine with a front-mounted fan.

FIG. 1 schematically depicts one example of a turbomachine in the form of a twin spool bypass turbojet engine 1. A fan 2 on the front supplies the engine with air. The air compressed by the fan is split into two concentric flows F1 and F2. The secondary, or bypass, flow F2 is discharged directly into the atmosphere and provides an essential proportion of the motive thrust. The primary flow F1 is guided through several compression stages 3 to the combustion chamber 4 where it is mixed with fuel and burnt. The hot gases power the various turbine stages 5 which drive the fan 2 and the compression rotors 3. The gases are then discharged into the atmosphere.

Figures 2, 7:
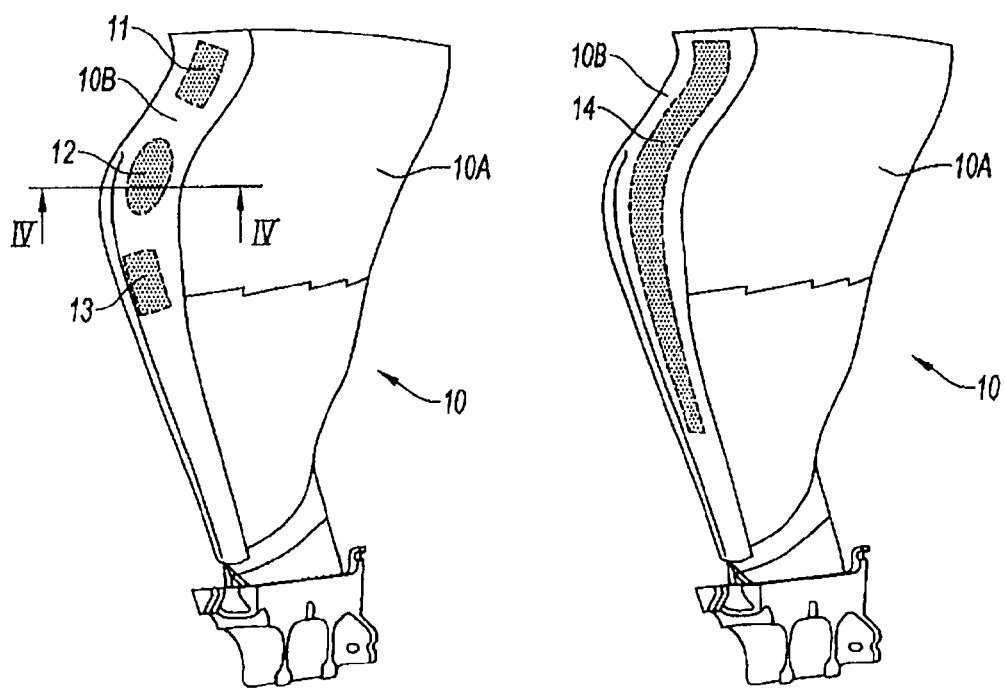
FIG. 2 shows a composite fan blade with a protective element protecting the leading edge, and shows the zones that comprise a viscoelastic damper.
FIG. 7 shows another positioning of the damping means.
Figure 3:
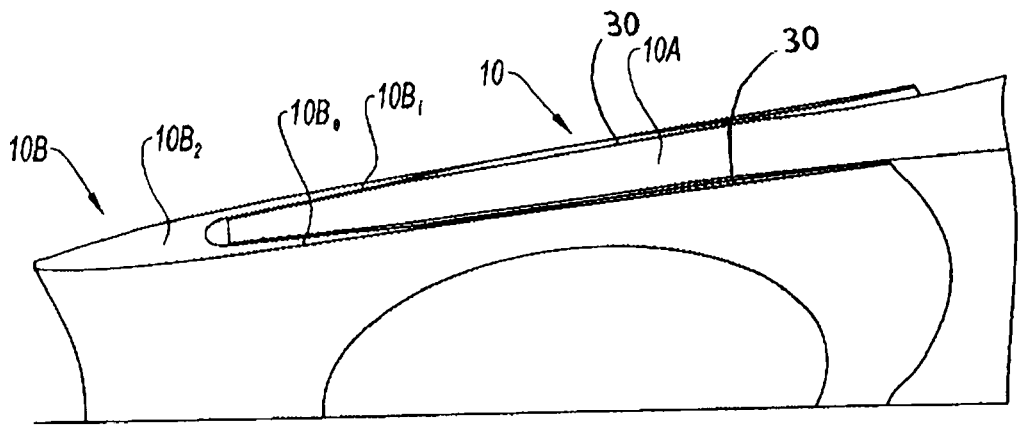
FIG. 3 shows, in a view of FIG. 2 from above, the region of the leading edge of the blade.

FIGS. 2 and 3 show a fan blade 10 that can be used on this type of engine. This is a blade made of composite. In general, the composite part 10A of the blade consists of fibers or filaments held together by a thermosetting resin. The fibers or filaments are made of carbon or some other material such as glass, silica, silicon carbide, alumina, aramid or an aromatic polyamide. The leading edge is covered with a metallic protection 10B. In this instance, it is a titanium foil bonded via the layer 30 on to the composite which runs along the leading edge, with a strip forming a wing on each side: one wing 10Bi on the intrados downstream of the leading edge and one wing 10Be on the extrados downstream of the leading edge. The two wings are connected along the leading edge by a thicker part 10B2. A blade such as this is manufactured, for example, using the technique described in patent EP 1.777.063 in the name of the current applicant.

According to this technique, a three-dimensional woven filament preform is constructed. The one-piece woven preform is then trimmed to shape by cutting around the contour in accordance with a three-dimensional chart. The component is placed in a forming mold. Next, after appropriate deformation, the component is placed in a compacting mold which makes the deformed preform more rigid. The leading edge is overcompacted so as to allow the protective element to be fitted along the leading edge. This is an element in the form of a longitudinal half-sleeve with two wings intended to cover a portion of the extrados and intrados walls downstream of the leading edge. As explained in the aforementioned patent, the protective element is placed in a mounting device capable of parting the wings. The protective element is positioned, via its leading edge pre-coated with adhesive, between the two wings then these wings are released.

The whole is placed in an injection mold into which there is injected a binder containing a thermosetting resin so as to impregnate the entire preform. Finally, the mold is heated.

According to the invention, at least one layer 20 of a viscoelastic material is incorporated between the vane 10A and the protective element 10B. The metal protective element 10B forms a rigid backing layer for the vibration-damping system that it forms with the layer of viscoelastic material.

Viscoelasticity is a property of a solid or of a liquid which, when deformed, exhibits both viscous and elastic behavior by simultaneously dissipating and storing mechanical energy.

A rigid material in the vibration damping system is more rigid than the viscoelastic material of the layer. In other words, the isotropic or anisotropic elasticity characteristics of the material of the backing layer are greater than the isotropic or anisotropic characteristics of the viscoelastic material in the desired thermal and frequency operating range. By way of nonlimiting example, the material of the backing layer is a metal and the material of the viscoelastic layer is of the rubber, silicone, elastomer polymer, epoxy resin, type.

FIG. 2 depicts three different damping means 11, 12 and 13 on three different zones incorporating at least one layer 20 of viscoelastic material under the protective element 10B that protects the leading edge.

Figure 4:
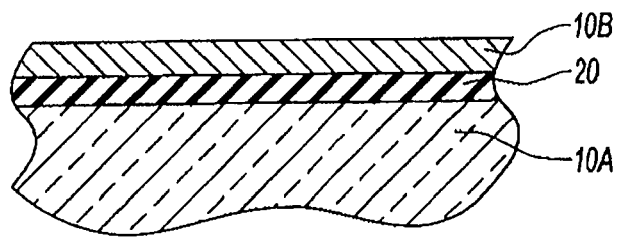
FIG. 4 shows a section on IV-IV of a first embodiment of how the viscoelastic material is arranged.

FIG. 4 shows, in section on IV-IV of FIG. 2, the arrangement of the viscoelastic layer 20 between the foil of the protective element 10B and the composite of the vane 10A. The damping means 11, 12 or 13 is placed in the zones where the amplitude of the dynamic deformations is preferably at its maximum, in this instance in that part of the vane that lies a remote distance from the root of the blade. This means may adopt various forms, oval or polygonal, dimensions and arrangements depending on the damping desired.

Figure 6:
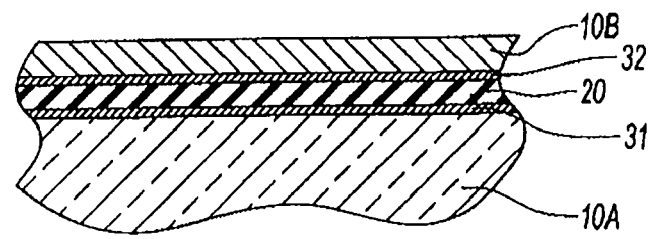
FIG. 6 shows another arrangement of the layer of viscoelastic material.

The viscoelastic material is made to stick to the vane by hot-cementing or alternatively by the interposition of a layer of adhesive 31 or, respectively, 32, as depicted in FIG. 6. In an alternative form, the stress layer that the foil forms is not stuck to the viscoelastic layer but pressed against it, being connected instead to the composite of the vane.

It should be noted that, in the zones outside of the damping means, the thickness of the viscoelastic layer is compensated for by the thickness of the layer of adhesive 30 that connects the foil to the composite.

According to an alternative form that has not been depicted, a cavity that forms a housing is machined, for the damper, in the foil, in the composite or in both.

Figure 5:
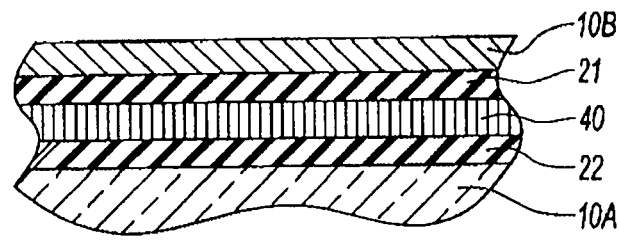
FIG. 5 shows another arrangement of the layer of viscoelastic material.

FIG. 5 shows another alternative form of embodiment of the damper according to the invention. In this instance it consists of an additional stress sheet 40, for example in the form of a metal sheet. A layer of viscoelastic material 21 is inserted between the foil of the protective element 10B and the metal sheet 40. A layer of viscoelastic material 22, the same as 21 or different, is inserted between the stress sheet 40 and the surface of the vane 10A. In this embodiment again, the layers may be joined together by hot-cementing or bonding depending on the materials selected.

FIG. 7 shows an alternative arrangement 14 of the damping system, the viscoelastic layer extending over a portion that is elongate along the leading edge of the vane 10A.

What is claimed is:

1. A blade made of composite, comprising a vane formed of woven filaments impregnated with a thermosetting resin with a protective element in the region of the leading edge of the vane comprising a part, in the form of a rigid strip, said strip being secured to the vane, wherein at least one layer of a viscoelastic material is at least partially interposed between said rigid strip and the vane so as to form, with the protective element, a means of damping the vibrations of the vane.

2. The blade as claimed in the preceding claim in which the layer of viscoelastic material is at least partially contained in a cavity formed in the composite.

3. The blade as claimed in claim 1 in which the layer of viscoelastic material is at least partially contained in a cavity formed in the protective element.

4. The blade as claimed in claim 1 in which the layer of viscoelastic material extends under the strip over part of its surface.

5. The blade as claimed in claim 4 in which the layer of viscoelastic material extends over a zone corresponding to a zone of maximum deformation for a determined vibration mode of the blade in order to form a vibration damping means.

6. The blade as claimed in claim 1 in which the layer of viscoelastic material forms a damping means over a zone running parallel to the leading edge of the vane.

7. The blade made of composite as claimed in claim 1 in which the protective element that protects the leading edge comprises two rigid strips with a common edge, the protective element covering the leading edge and partially covering the two, intrados and extrados, faces adjacent the leading edge.

8. The blade as claimed in claim 1, in which the viscoelastic material is chosen from the following materials: rubber, silicone, elastomer polymer or epoxy resin.

9. The blade as claimed in claim 1, in which the protective element that protects the leading edge is made of a metal foil.

10. The blade as claimed in claim 1, in which an additional rigid plate is inserted between said strip and the vane with two layers of viscoelastic material positioned one on each side of the plate.

11. The blade as claimed in the preceding claim, in which the layers of viscoelastic material positioned on each side of the plate are different.

12. The blade as claimed in claim 1, in which the layer of viscoelastic material has been secured to the strip and/or to the vane by hot-cementing the film of viscoelastic material.

13. The blade as claimed in claim 1, in which the layer of viscoelastic material has been secured to the strip and/or to the vane by bonding using an adhesive substance.

14. A gas turbine engine compressor comprising at least one blade as claimed in one of the preceding claims.

15. A turbojet engine comprising a fan with at least one blade as claimed in one of claims 1 to 13.

16. The turbojet engine as claimed in claim 15 in which said fan is of the unducted fan type.

* * * * *